United States Patent
Mansour et al.

(10) Patent No.: US 10,813,111 B1
(45) Date of Patent: Oct. 20, 2020

(54) SCHEDULING LOW-PRIORITY TRANSMISSIONS

(71) Applicant: Sprint Spectrum LP, Overland Park, KS (US)

(72) Inventors: Nagi A Mansour, Arlington, VA (US); Kevin Hart, Oakton, VA (US); Aneesha Sridhar, Herndon, VA (US); Tzuo-Shuo Li, West Windsor, NJ (US)

(73) Assignee: Sprint Spectrum L.P., Overland Park, KS (US)

( * ) Notice: Subject to any disclaimer, the term of this patent is extended or adjusted under 35 U.S.C. 154(b) by 348 days.

(21) Appl. No.: 15/643,660

(22) Filed: Jul. 7, 2017

(51) Int. Cl.
*H04W 72/12* (2009.01)
*H04W 72/14* (2009.01)

(52) U.S. Cl.
CPC ... *H04W 72/1242* (2013.01); *H04W 72/1257* (2013.01); *H04W 72/1263* (2013.01); *H04W 72/14* (2013.01)

(58) Field of Classification Search
CPC ......... H04W 72/1242; H04W 72/1257; H04W 72/1263; H04W 72/14
USPC ....................................................... 370/329
See application file for complete search history.

(56) References Cited

U.S. PATENT DOCUMENTS

| | | |
|---|---|---|
| 2008/0232510 A1* | 9/2008 | Golitschek Edler Von Elbwart ............... H04L 25/067 375/298 |
| 2016/0050601 A1 | 2/2016 | Jeong et al. |
| 2016/0374080 A1 | 12/2016 | Wei et al. |
| 2017/0171873 A1* | 6/2017 | Shaw ...................... H04W 4/70 |
| 2017/0359820 A1* | 12/2017 | Gaal .................... H04L 5/0051 |
| 2018/0063841 A1* | 3/2018 | Song ................. H04W 72/0453 |
| 2018/0199306 A1* | 7/2018 | Edge ................... H04W 64/003 |
| 2018/0248675 A1* | 8/2018 | Bhattad ............... H04L 27/2613 |
| 2018/0262975 A1* | 9/2018 | Martinez Tarradell ..................... H04W 74/008 |
| 2018/0287846 A1* | 10/2018 | Kim .......................... H04L 5/00 |
| 2018/0309551 A1* | 10/2018 | Baldemair ............ H04L 5/0039 |
| 2018/0324856 A1* | 11/2018 | Zhang ............... H04W 74/0808 |
| 2018/0338304 A1* | 11/2018 | Gheorghiu .......... H04W 72/048 |
| 2018/0343085 A1* | 11/2018 | Tirucherai Muralidharan ............ H04L 1/0013 |
| 2018/0352520 A1* | 12/2018 | Zhang ................... H04W 52/40 |
| 2018/0367278 A1* | 12/2018 | Chatterjee ............... H04W 4/70 |
| 2018/0367285 A1* | 12/2018 | Yi ........................ H04L 5/0055 |
| 2019/0200410 A1* | 6/2019 | Hoglund ............... H04W 76/10 |
| 2019/0268827 A1* | 8/2019 | Kim ...................... H04W 48/08 |
| 2019/0342829 A1* | 11/2019 | Klatt ................. H04W 52/0216 |
| 2019/0380148 A1* | 12/2019 | Dudda ............. H04W 74/0808 |
| 2020/0037254 A1* | 1/2020 | Comsa ............... H04W 52/365 |

* cited by examiner

Primary Examiner — Christopher R Crompton

(57) ABSTRACT

Devices, systems, and methods for scheduling resources in a wireless network are configured to perform operations including identifying one or more resources that are available for low-priority transmissions from an internet-of-things (IoT) device, determining that the available resources are non-contiguous, rescheduling scheduled resources until the available resources are contiguous, and scheduling the low-priority transmissions using the available resources.

18 Claims, 9 Drawing Sheets

SCHEDULING LOW-PRIORITY TRANSMISSIONS

TECHNICAL BACKGROUND

The Internet of Things (IoT) is a network of physical objects, machines, people and other devices which are connected and are able to communicate and exchange data for intelligent applications and services, which has been expanded to various fields, including connected cities, connected industries, connected transportation, connected home and connected heath care. IoT is expected to grow rapidly in the near future and to be the next revolution in the mobile ecosystem. Adding large numbers of IoT devices brings additional challenges to operators of existing wireless networks, such as scheduling resources for IoT transmissions without impacting scheduled transmissions for existing wireless devices.

OVERVIEW

Exemplary embodiments described herein include systems, methods, and nodes for scheduling resources in a wireless network. Exemplary methods for scheduling resources in a wireless network include monitoring a usage of air-interface resources deployed by an access node, wherein the air-interface resources comprise a plurality of resource blocks within a frequency bandwidth, identifying a portion of the air-interface resources that are available for low-priority transmissions from a wireless device, and scheduling the portion of the air-interface resources for the low-priority transmissions.

Exemplary systems for scheduling resources in a wireless network include a processing node, and a processor coupled to the processing node, the processor for configuring the processing node to perform operations including identifying available resource blocks from a plurality of resource blocks deployed by an access node, wherein the available resource blocks provide a minimum bandwidth level that is sufficient for a low-priority transmission, and scheduling a portion of the available resource blocks for the low-priority transmission, wherein the low-priority transmission is generated by an internet-of-things (IoT) device.

Exemplary processing nodes for scheduling resources in a wireless network are configured to perform operations including identifying one or more resources that are available for low-priority transmissions from an internet-of-things (IoT) device, determining that the available resources are non-contiguous, rescheduling scheduled resources until the available resources are contiguous, and scheduling the low-priority transmissions using the available resources.

DETAILED DESCRIPTION

Figure 1:
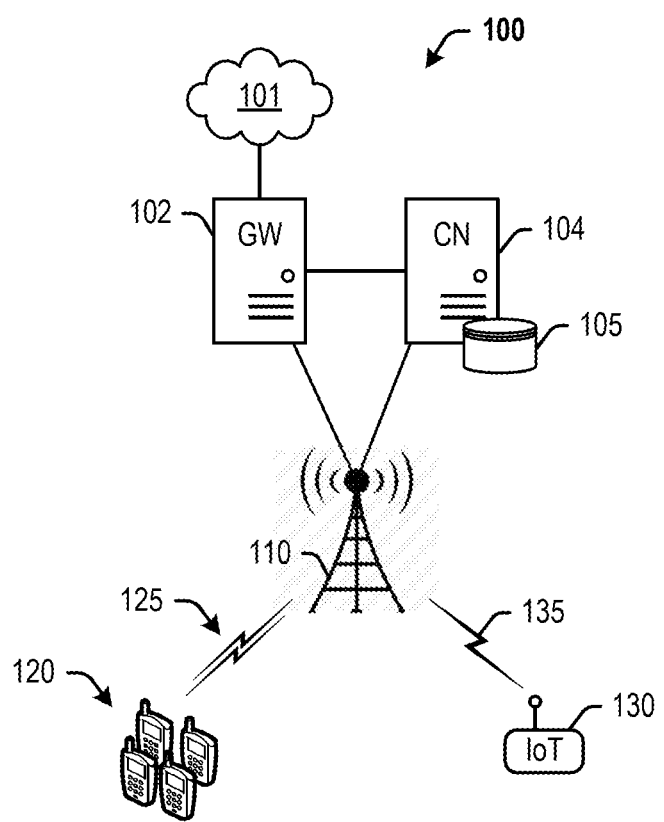
FIG. 1 illustrates an exemplary system for scheduling resources.

The disclosed embodiments illustrate devices, systems, and methods for scheduling resources in a wireless network. Operations performed by the disclosed embodiments include monitoring a usage of air-interface resources deployed by an access node. An access node deploys a radio air interface comprising radio resources divided into a plurality of resource blocks. For example, the radio resources include a plurality of resource blocks within a frequency bandwidth, such as 1.4 MHz, 5 MHZ, etc. Monitoring the usage comprises identifying resource blocks that are scheduled for transmissions from other wireless devices.

Subsequently, identifying the portion of air-interface resources available for low-priority transmissions comprises identifying unused resource blocks from the plurality of resource blocks. A portion of the air-interface resources that are available for low-priority transmissions from a wireless device are identified. The portion of the air-interface resources are scheduled for the low-priority transmissions. The low-priority transmission may be generated by an internet-of-things (IoT) device, or addressed to the IoT device. Thus, a minimum amount of available or unused resource blocks that provide a level of bandwidth that is required for a low-priority transmission are identified. For example, identifying unused resource blocks further comprises identifying at least one unused resource slot having a bandwidth of 180 kHz. Any available or unused resource slots having a bandwidth of 180 kHz can be scheduled towards a narrowband internet-of-things (NB-IoT) transmission. Alternatively or in addition, identifying unused resource blocks comprises identifying at least one unused resource slot having a bandwidth of 1080 kHz. Any available or unused resource slots having a bandwidth of 1080 kHz can be scheduled towards a long-term-evolution category-M (LTE-M) transmission. Other combinations of resource slots that match resource requirements of various types of IoT transmissions may become apparent to those having ordinary skill in the art in light of this disclosure.

Further, scheduling the portion of air-interface resources for the low-priority transmissions can include scheduling unused resource blocks at an edge of the frequency bandwidth. The edge of the frequency bandwidth may be determined based on a distance from a center frequency. Moreover, the portion of available air-interface resources may be identified as being non-contiguous. In other words, 320 kHz of resources may be divided into two portions comprising 160 kHz each, on either end of a frequency spectrum. In this case, the center frequency may be shifted until a contiguous portion of air-interface resources becomes available. In other words, the center frequency is shifted and already-scheduled resource blocks are rescheduled such that a first edge of the spectrum now includes at least 180 kHz of contiguous resources, and the second edge includes the remaining 140 kHz. Alternatively or in addition, upon determining that the portion of air-interface resources that are available is non-contiguous, a distance from the center frequency may be adjusted until a contiguous portion of air-interface resources becomes available. Further, multiple retransmissions may be enabled for the low-priority transmissions. These and other operations are further described below with reference to the embodiments depicted in FIGS. 1-11.

FIG. 1 depicts an exemplary system 100 for scheduling resources in a wireless network. System 100 comprises a communication network 101, gateway 102, controller node 104, access node 110, wireless devices 120, and internet-of-things (IoT) device 130. Wireless devices 120 are illustrated as accessing network services from access node 110 via communication links 125. Communication links 125 may include, for example, LTE communication links for transmitting data and voice between wireless devices 120 and network 101. Further, IoT device 130 is illustrated as accessing network services from access node 110 via communication link 135. Communication link 135 may include, for example, narrowband (NB) LTE or LTE-M communication links for transmitting low-priority data packets between IoT device 130 and network 101.

Access node 110 may further be configured to monitor a usage of air-interface resources deployed therefrom, and schedule transmissions to and from IoT device 130 in any unused resources as further described herein. For example, radio air interface deployed by access node 110 may comprise radio resources divided into a plurality of resource blocks within a frequency bandwidth, such as 1.4 MHz, 5 MHZ, etc. Monitoring the usage of resources can include identifying resource blocks that are scheduled for transmissions from other wireless devices, such as wireless devices 120 that have a normal or high priority. Thus, identifying the portion of air-interface resources available for low-priority transmissions (such as transmissions to and from IoT device 130) includes identifying unused resource blocks from the plurality of resource blocks. Thus, available or unused resource blocks that provide a minimum level of bandwidth required for a low-priority transmission are identified. For example, identifying unused resource blocks further comprises identifying at least one unused resource slot having a bandwidth of 180 kHz. Any available or unused resource slots having a bandwidth of 180 kHz can be scheduled towards a narrowband internet-of-things (NB-IoT) transmission. Alternatively or in addition, identifying unused resource blocks comprises identifying at least one unused resource slot having a bandwidth of 1080 kHz. Any available or unused resource slots having a bandwidth of 1080 kHz can be scheduled towards a long-term-evolution category-M (LTE-M) transmission. Other combinations of resource slots that match resource requirements of various types of IoT transmissions may become apparent to those having ordinary skill in the art in light of this disclosure.

Further, a scheduling module within access node 110 may be configured to schedule unused resource blocks at an edge of the frequency bandwidth for the IoT transmissions. The edge of the frequency bandwidth may be determined based on a distance from a center frequency. Moreover, the portion of available air-interface resources may be identified as being non-contiguous. In other words, 320 kHz of resources may be divided into two portions comprising 160 kHz each, on either end of a frequency spectrum. In this case, the center frequency may be shifted until a contiguous portion of air-interface resources becomes available. In other words, the center frequency is shifted and already-scheduled resource blocks are rescheduled such that a first edge of the spectrum now includes at least 180 kHz of contiguous resources, and the second edge includes the remaining 140 kHz. Alternatively or in addition, upon determining that the portion of air-interface resources that are available is non-contiguous, a distance from the center frequency may be adjusted until a contiguous portion of air-interface resources becomes available. Further, multiple retransmissions may be enabled for the low-priority and/or IoT transmissions.

Access node 110 can be any network node configured to provide communication between wireless devices 120, 130 and communication network 101, including standard access nodes and/or short range, low power, small access nodes. For instance, access node 110 may include a macrocell access node, base transceiver station, a radio base station, an eNodeB device, an enhanced eNodeB device, or the like. In an exemplary embodiment, a macrocell access node can have a coverage area in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. Moreover, it is noted that while access node 110 is illustrated in FIG. 1, any number of access nodes can be implemented within system 100.

Access node 110 can comprise processors and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120 and IoT device 130 may be any device, system, combination of devices, or other such communication platform capable of communicating wirelessly with access node 110 using one or more frequency bands deployed therefrom. Wireless devices 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. IoT device 130 is a specific type of device that is intended to transmit or receive data using specific LTE communications that coexist seamlessly with existing and planned LTE spectrum and infrastructure, and can be scaled down in complexity and power (as compared to wireless devices 120) to very low-throughput applications such as sensors and meters, wearable devices, monitors, or similar.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 125, 135. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a packet data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as presence and numbers of wireless devices 120 and IoT devices such as IoT device 130, scheduling schemes associated with access node 110 and wireless devices connected thereto, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
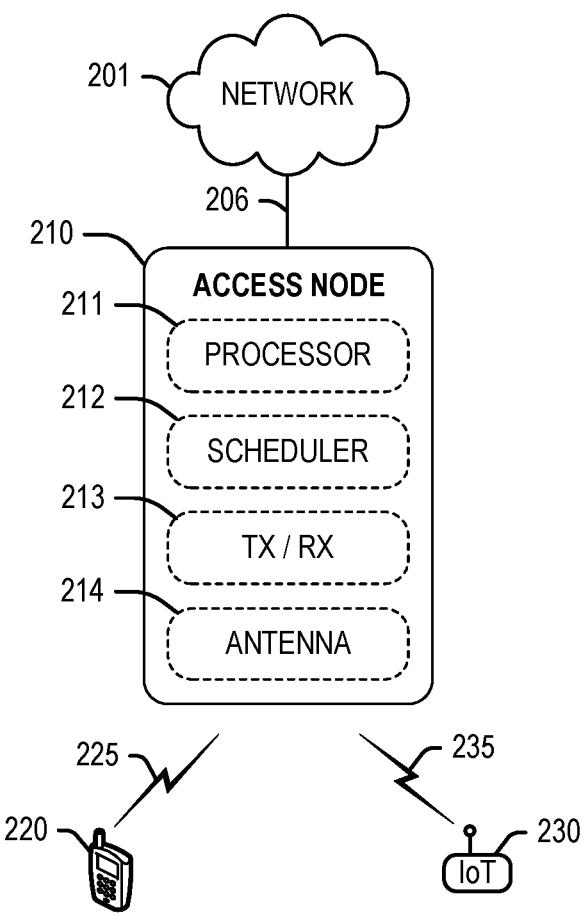
FIG. 2 illustrates an exemplary access node.

FIG. 2 depicts an exemplary access node 210. Access node 210 may comprise, for example, a macro-cell or a small-cell access node, such as access node 110 described with reference to FIG. 1. Access node 210 provides wireless device 220 with access to network services and applications on network 201, and is configured to transmit data to (and receive data from) wireless device 220 and IoT device 230 via communication links 225 and 235, respectively. Access node 210 is illustrated as comprising a processor 211, scheduler 212, transceiver 213, and antenna 214. Processor 211 executes instructions stored on scheduler 212, while transceiver 213 and antenna 214 enable communication with wireless devices 220, 230. Scheduler 212 includes a memory and instructions stored thereon for performing the scheduling operations described herein, such as with reference to FIGS. 4 and 7.

Figure 3:
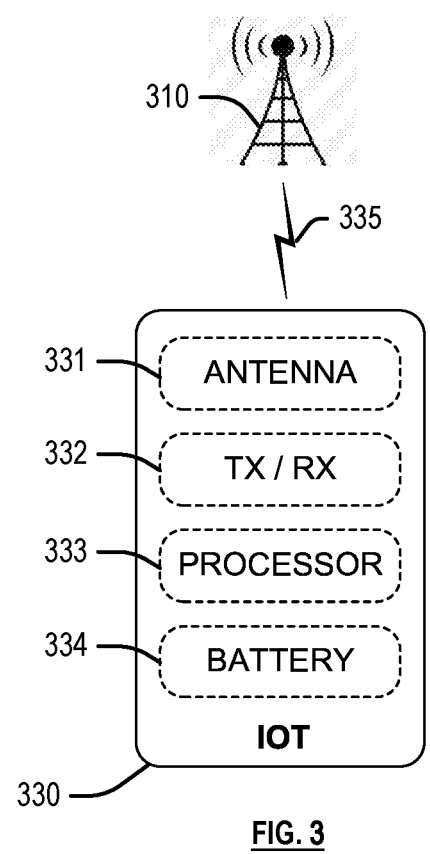
FIG. 3 illustrates an exemplary internet of things (IoT) device.

FIG. 3 illustrates an exemplary internet of things (IoT) device 330. As described above, IoT device 330 can be any device appropriately configured to communicate small amounts of data, such as sensor readings, or receive instructions to perform measurements, etc. over a communication link 335. For example, IoT devices may comprise machines, parts of machines, smart meters, sensors or even everyday objects such as retail goods or wearables. In this exemplary embodiment, IoT device 330 is illustrated as comprising an antenna 331, transceiver 332, processor 333, and batter 334. Processor 333 executes instructions that may be hard-wired or stored on a memory coupled thereto. For example, processor 333 may comprise a system-on-chip (SoC) design, or any other microcontroller device. Battery 334 provides a power supply for enabling performance of operations by processor 333, as well as low-power transmissions utilizing transceiver 332 and antenna 331. For instance, many IoT devices must operate for very long times, often years, without human intervention, such as a fire alarm device for sending data directly to a fire department.

Transceiver 332 and antenna 331 are appropriately configured to communicate with access node 310 over communication link 335 using various communication pathways, as further shown in Table 1 below.

TABLE 1

| Bandwidth | Used | Unused | Number of NB-IoT transmissions | Number of LTE-M transmissions |
|---|---|---|---|---|
| 1.4 MHz | 6 RBs = 1080 kHz | 320 kHz | 1 × 180 kHz | 0 |
| 5 MHz | 25 RBs = 4500 kHz | 500 kHz | 2 × 180 kHz | 0 |
| 20 MHz | 100 RBs = 18000 kHz | 2000 kHz | 11 × 180 kHz | 1 × 1080 kHz |

For example, transceiver 332 and antenna 331 may be configured to utilize narrowband IoT (NB-IoT), which is a low power radio technology standard that has been developed to enable a wide range of devices and services to be connected using cellular telecommunications bands. A single NB-IoT transmission requires 180 kHz, i.e. a single resource slot. Thus, an available bandwidth of 320 kHz enables one 180 kHz transmission, and an available bandwidth of 500 kHz enables two 180 kHz transmissions. Another IoT technology includes LTE-M, which is an abbreviated version of LTE-MTC (or "machine-type communications"). Standard LTE channels are made up of resource blocks of about 230 kHz of spectrum, and LTE-M is part of the 1.4 MHz block, comprised of six resource blocks. Thus, an available bandwidth of 2000 kHz enables one 1080 kHz transmission, or eleven 180 kHz transmissions. Additional IoT technologies include eMTC (enhanced Machine-Type Communication) and EC-GSM-IoT, and other combinations of bandwidths and numbers of transmissions may be envisioned by those having ordinary skill in the art in light of this disclosure.

Figure 4:
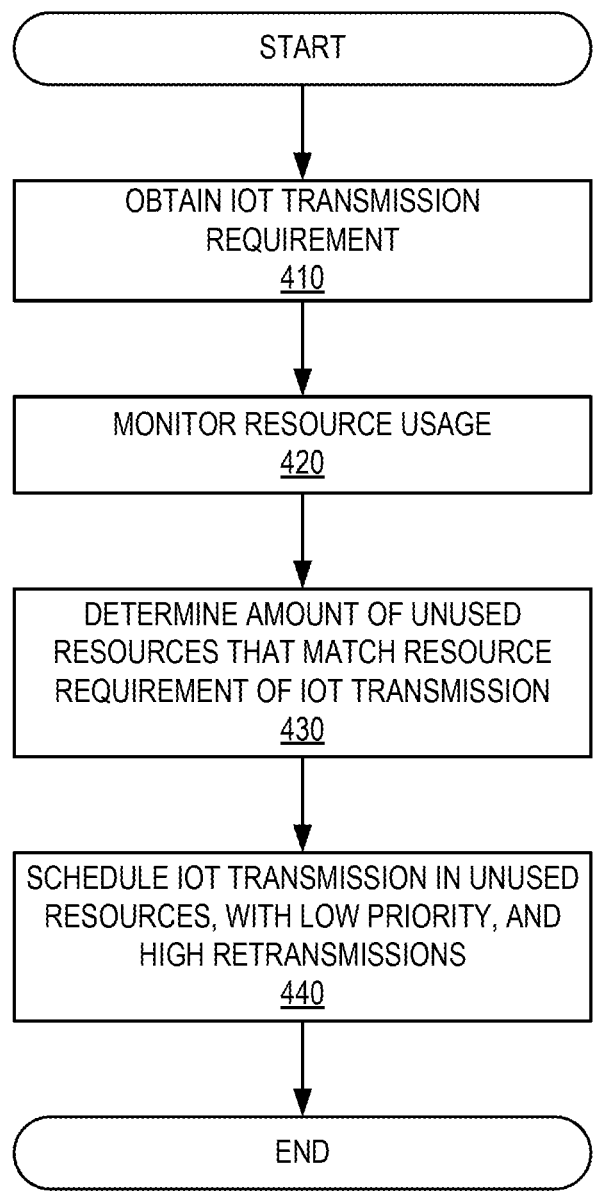
FIG. 4 illustrates an exemplary method for scheduling resources.

FIG. 4 illustrates an exemplary method for scheduling resources. The method may be performed by any network nodes described herein, such as access node 110/210. The method may further be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 410, an IoT transmission requirement is obtained. The IoT transmission requirement may be associated with a transmission that is generated by an IoT device, or a transmission addressed to the IoT device from another network entity. For example, an IoT device may be purchased by a user and registered with an LTE network, upon which an access node (or any other processing node) is configured to schedule resources for the new IoT device. In some embodiments, an IoT device requests resources from an access node by registering with the access node upon being turned on, or upon determining that it requires resources to transmit data to a network entity via the access node. In some embodiments, a network entity may request resources from the access node (or another core network node) for transmissions directed to the IoT device, such as instructions or configuration messages.

In either case, a usage of air-interface resources deployed by the access node are monitored at 420. For example, the access node deploys a radio air interface comprising radio resources divided into a plurality of resource blocks within a frequency bandwidth, such as 1.4 MHz, 5 MHZ, etc. Monitoring the usage comprises identifying resource blocks that are scheduled for transmissions to/from other wireless devices attached to the access node. Subsequently, at 430, a portion of air-interface resources available for low-priority transmissions are identified. The available air-interface resources may be matched to a resource requirement of the IoT transmission, and scheduled for the IoT transmission at 440. In other words, available or unused resource blocks that provide a level of bandwidth required for an IoT transmission are identified. For example, any available or unused resource slots having a bandwidth of 180 kHz can be scheduled towards a narrowband internet-of-things (NB-IoT) transmission. Multiple blocks of 180 kHz may correspondingly be scheduled towards multiple NB-IoT transmissions. Alternatively or in addition, any available or unused resource slots having a bandwidth of 1080 kHz can be scheduled towards a long-term-evolution category-M (LTE-M) transmission. Other combinations of resource slots that match resource requirements of various types of IoT transmissions may become apparent to those having ordinary skill in the art in light of this disclosure. Further, since IoT transmissions do not have the same latency and resource requirements of other wireless transmissions (such as voice and data), they can be prioritized lower than the other wireless transmissions, and scheduled at an edge of the frequency spectrum (where they may be more likely to be subject to interference). In addition, multiple retransmissions may be enabled for the low-priority transmissions, since transmissions that fail can be retransmitted without any apparent or perceived lack of QoS.

Figure 5:
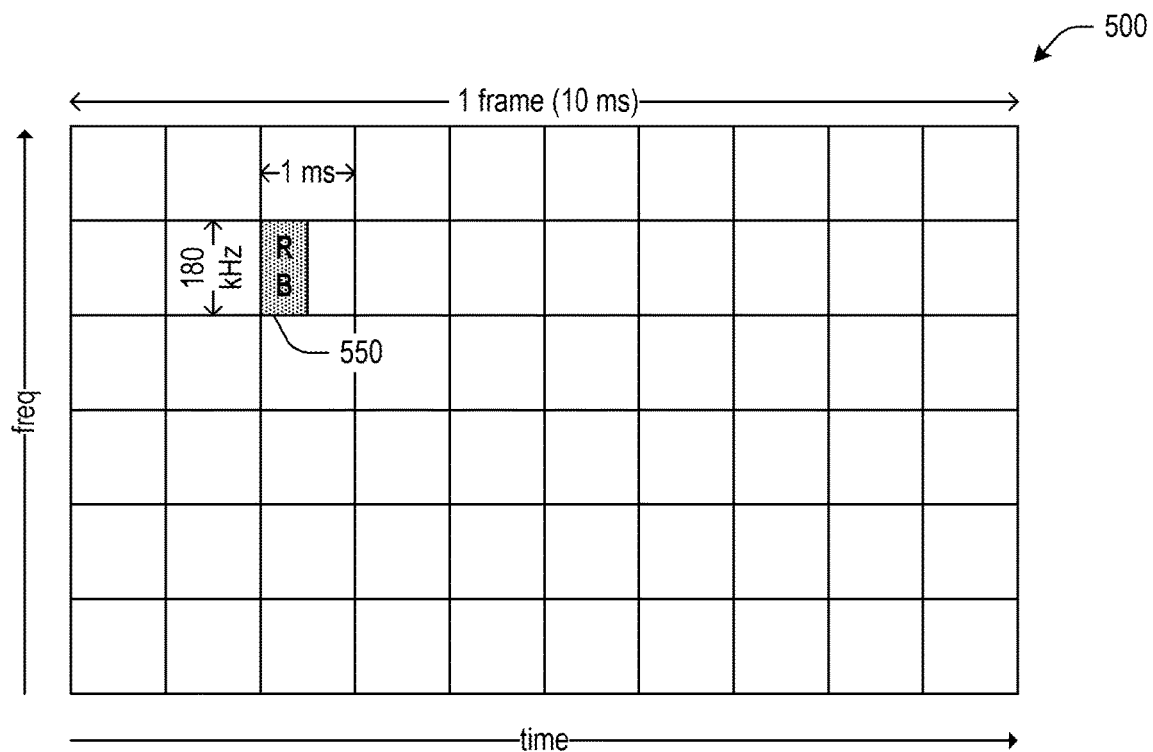
FIG. 5 illustrates an exemplary resource block within a radio air interface deployed by an access node.

FIG. 5 illustrates an exemplary resource block within a radio air interface deployed by an access node. As is generally known in the art, an LTE radio frame, such as frame 500, is 10 ms in duration, and comprises 10 subframes, each of which is 1 ms in duration. A subframe comprises two resource blocks (RBs), such as RB 550, each of which is 0.5 ms in duration. Further, each RB has a bandwidth of 180 kHz and, although six blocks are depicted along the vertical frequency axis, more may be included and are not depicted for reasons of clarity. On a 10 MHz carrier, for instance, 50 blocks may be used, and on a 20 MHz carrier, 100 blocks may be used. As further described herein, one or more resource blocks that are available or unscheduled for other transmissions may be scheduled for low-priority IoT transmissions, particularly those RBs at the edge of a particular spectrum or bandwidth.

Figure 6:
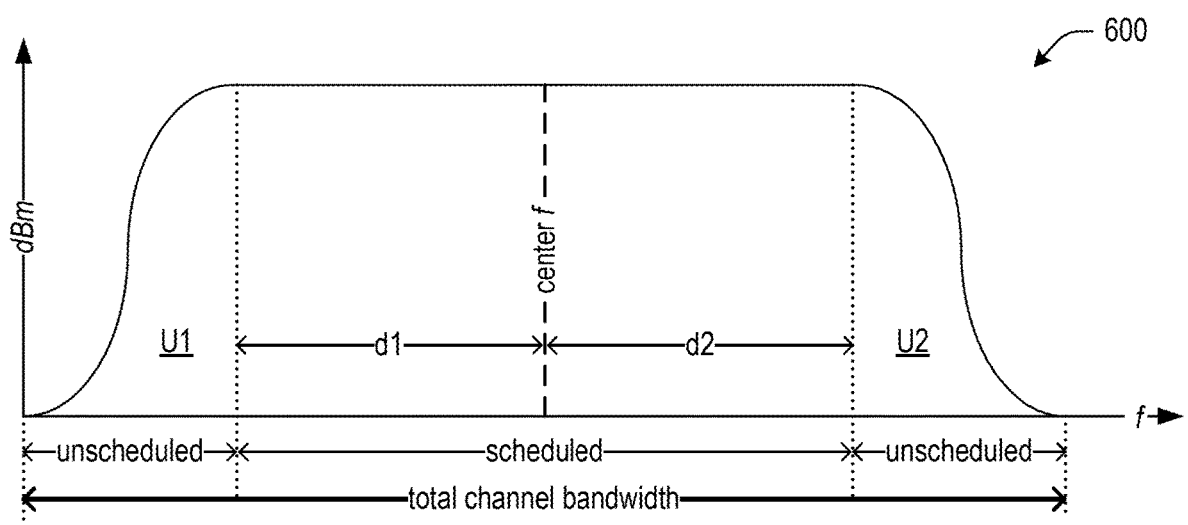
FIG. 6 illustrates an exemplary frequency spectrum of a channel within a radio air interface deployed by an access node.

FIG. 6 illustrates an exemplary frequency spectrum 600 of a channel within a radio air interface deployed by an access node. The x-axis depicts a frequency f, and the y-axis depicts a signal level in dBm. A combination of a center frequency and a total bandwidth is used to define frequency spectrum 600. For example, a total channel bandwidth of 20 MHz may be centered around a center frequency of 1800 MHz, such that a low end of the frequency spectrum is 1790 MHz and a high end of the frequency spectrum is 1810 MHz. Other combinations are commonly used and evident to those skilled in the art. For example, channels can have bandwidths of 1.4 MHz, 3 MHz, 5 MHz, 10 MHz, 15 MHz, and 20 MHz, and center frequencies ranging from 400 MHz to 4 GHz, depending on the implementation of the wireless network.

In this embodiment, resources are scheduled for standard-priority or high-priority transmissions within distances d1 and d2 of the center frequency. Any other portion of the total channel bandwidth is unused, and is illustrated herein as unscheduled portions U1 and U2. Specifically, unused portion U1 is at a low end of frequency spectrum 600 and outside distance d1 from the center frequency, and unused portion U2 is at a high end of frequency spectrum 600 and outside distance d2 from the center frequency. In some embodiments, unused portions of resources U1 and/or U2 may include a guard band of frequency spectrum 600. A guard band is a narrow frequency range that separates two ranges of wider frequency. This ensures that simultaneously used communication channels do not experience interference, which would result in decreased quality for both transmissions. For example, a plurality of frequency channels (not shown herein), each of which comprises a total channel bandwidth, may be scheduled adjacent to each other. Thus, the guard band ensures that these adjacent channels do not interfere with each other. Further, scheduling low-priority IoT transmissions within a guard band and a specified distance away from a center frequency with an increased number of retransmissions ensures that the IoT transmissions eventually make it to their destination, even if they are subjected to increased interference at the edge of the spectrum.

Figure 7:
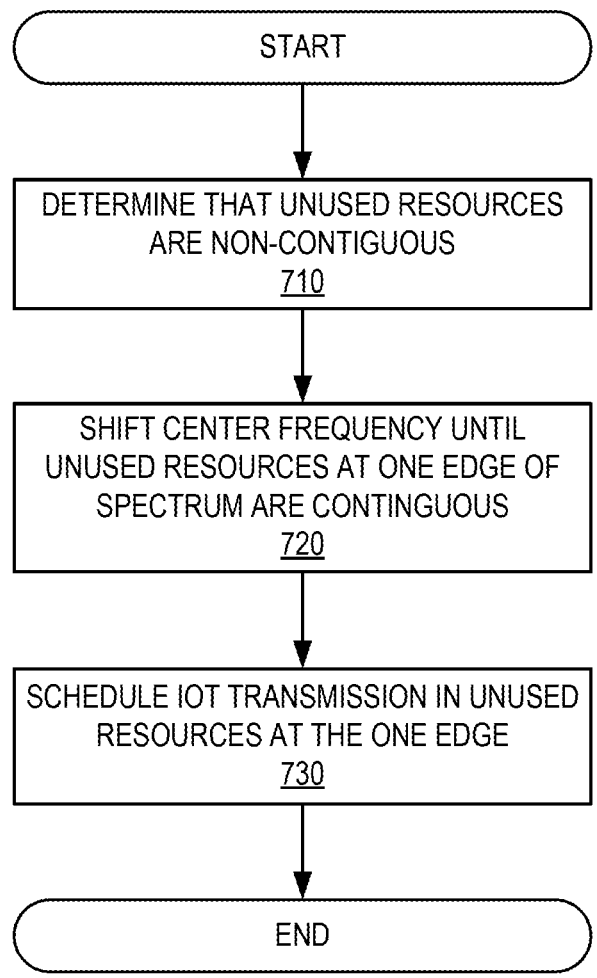
FIG. 7 illustrates an exemplary method for scheduling non-contiguous resources by shifting a center frequency.

Further, the portion of available air-interface resources may be identified as being non-contiguous, and existing resource blocks rescheduled as further described herein with respect to FIGS. 7-10. For example, FIG. 7 illustrates an exemplary method for scheduling non-contiguous resources by shifting a center frequency. The method of FIG. 7 may be performed by any network nodes described herein, such as access node 110/210. The method may further be implemented with any suitable communication system. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways. Further, the method of FIG. 7 is also described with reference to frequency spectra 800 depicted in FIGS. 8A and 8B.

Figure 8A:
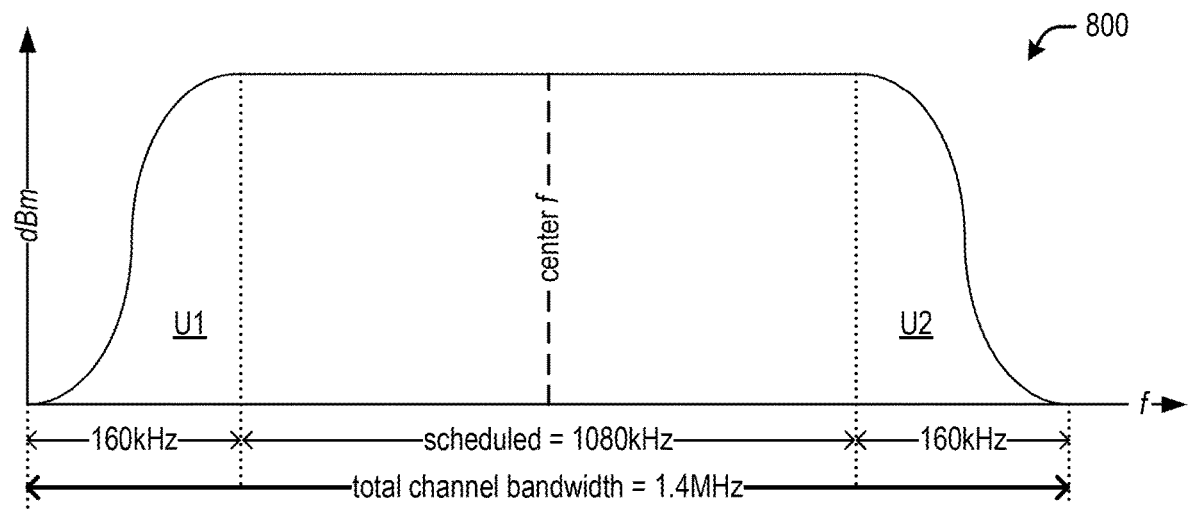
FIGS. 8A-8B illustrate an exemplary frequency spectrum with a shifted center frequency.
Figure 8B:
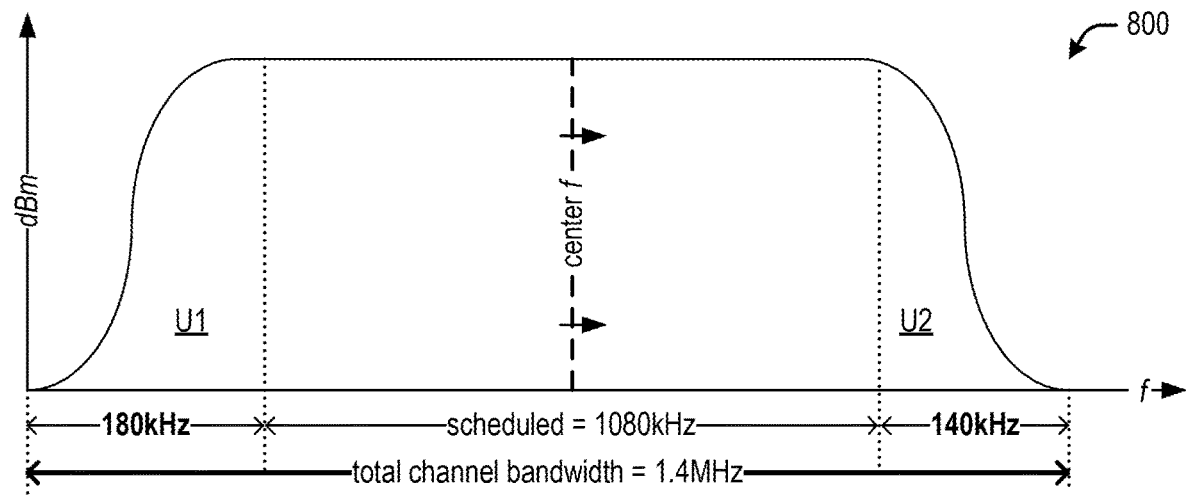

At 710 it is determined that the unused portions of the resources deployed by an access node are not contiguous. For example, with reference to FIG. 8A, given a 1.4 MHz frequency bandwidth, the available 320 kHz of resources may be divided into two portions U1 and U2, each of which has a bandwidth of 160 kHz on either end of frequency spectrum 800. Thus, at 710, it is determined that a contiguous block of 180 kHz is not available. In this case, at 720, the center frequency may be shifted until a contiguous portion of air-interface resources becomes available. For example, with reference to FIG. 8B, the center frequency is shifted to the right, and already-scheduled resource blocks are rescheduled such that region U1 at the first edge of frequency spectrum 800 now includes at least 180 kHz of contiguous resources, and region U2 at the second edge includes the remaining 140 kHz. The total channel bandwidth remains at 1.4 MHz, and the scheduled portion of resources remains at 1080 kHz, such that the scheduled transmissions are not affected. Subsequently, at 730, the NB-IoT transmission is scheduled in region U1 comprising 180 kHz.

Figure 9:
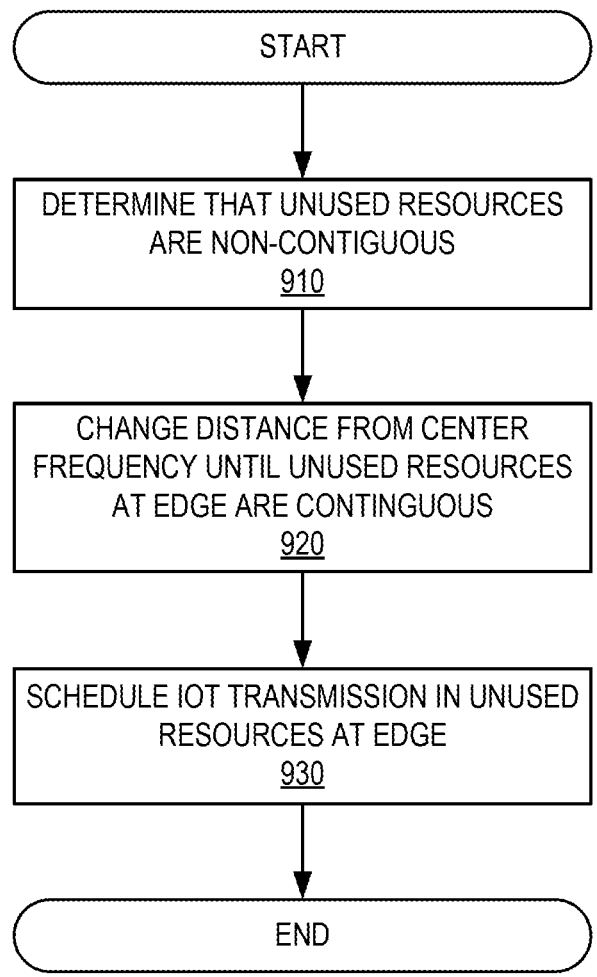
FIG. 9 illustrates an exemplary method for scheduling non-contiguous resources by changing a distance from a center frequency.

Alternatively or in addition, upon determining that the portion of air-interface resources that are available is non-contiguous, a distance from the center frequency may be adjusted until a contiguous portion of air-interface resources becomes available. FIG. 9 illustrates an exemplary method for scheduling non-contiguous resources by changing a distance from a center frequency. The method of FIG. 9 may be performed by any network nodes described herein, such as access node 110/210. The method may further be implemented with any suitable communication system. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways. Further, the method of FIG. 9 is also described with reference to frequency spectra 1000 depicted in FIGS. 10A and 10B.

Figure 10A:
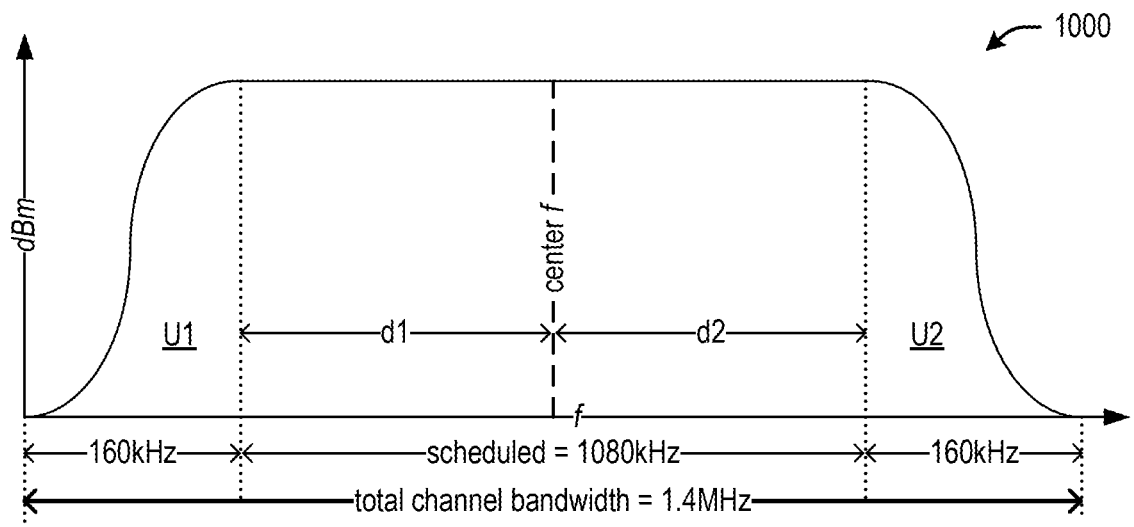
FIGS. 10A-10B illustrate an exemplary frequency spectrum with changed distance from the center frequency.
Figure 10B:
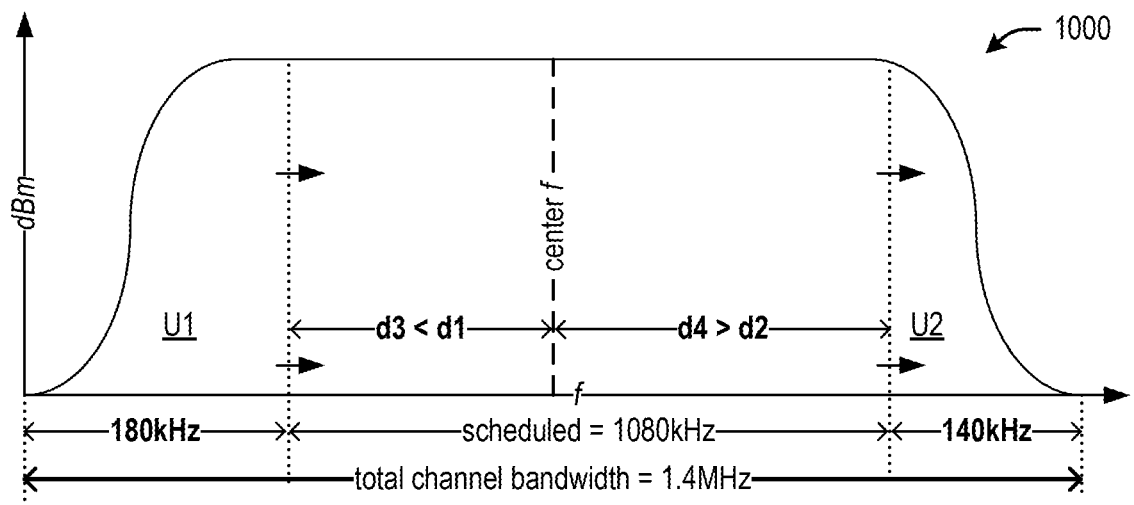

At 910 it is determined that the unused portions of the resources deployed by an access node are not contiguous. For example, with reference to FIG. 10A, given a 1.4 MHz frequency bandwidth, the available 320 kHz of resources may be divided into two portions U1 and U2, each of which has a bandwidth of 160 kHz on either end of frequency spectrum 1000, and at distances d1 and d2 from the center frequency, respectively. Thus, at 910, it is determined that a contiguous block of 180 kHz is not available. In this case, at 920, a distance from the center frequency may be adjusted until a contiguous portion of air-interface resources becomes available. For example, with reference to FIG. 10B, while the center frequency remains the same, the distance at which resources are scheduled is reduced from d1 to d3. To avoid impacting already-scheduled transmissions, the distance at which resources are scheduled on the right side is increased from d2 to d4. Thus, region U1 at the first edge of frequency spectrum 800 is increased to 180 kHz of contiguous resources, and region U2 at the second edge includes the remaining 140 kHz. The total channel bandwidth remains at 1.4 MHz, and the scheduled portion of resources remains at 1080 kHz, such that the scheduled transmissions are not affected. Subsequently, at 930, the NB-IoT transmission is scheduled in region U1 comprising 180 kHz.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 11:
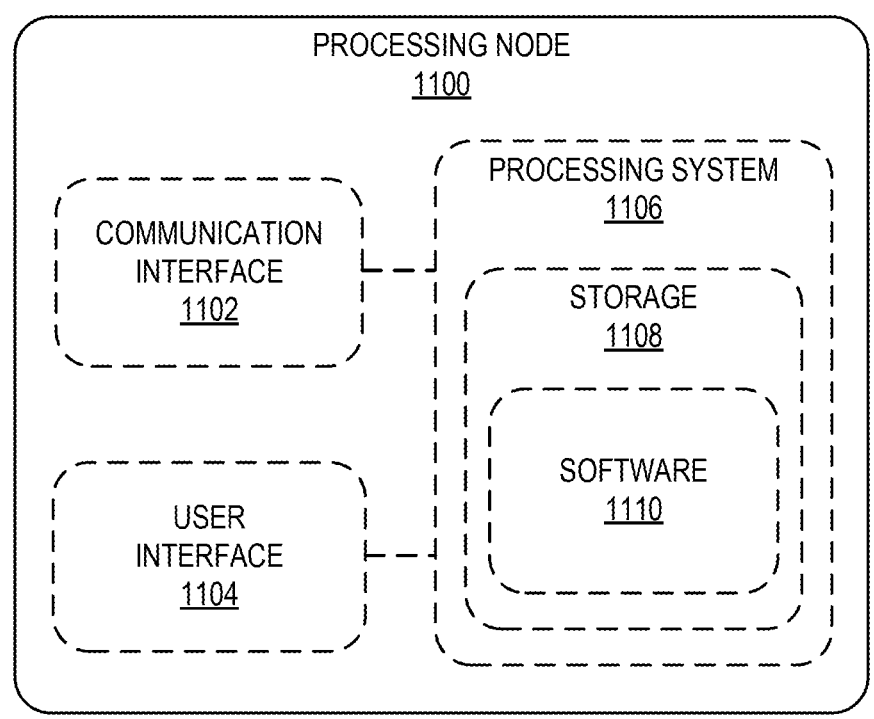
FIG. 11 illustrates an exemplary processing node for scheduling resources.

FIG. 11 illustrates an exemplary processing node 1100 comprising communication interface 1102, user interface 1104, and processing system 1106 in communication with communication interface 1102 and user interface 1104. Processing node 1100 is capable of paging a wireless device and communicating with access nodes via communication interface 1102. Processing system 1106 includes storage 1108, which can comprise a disk drive, flash drive, memory circuitry, or other memory device. Storage 1108 can store software 1110 which is used in the operation of the processing node 1100. Storage 1108 may include a disk drive, flash drive, data storage circuitry, or some other memory apparatus. Software 1110 may include computer programs, firmware, or some other form of machine-readable instructions, including an operating system, utilities, drivers, network interfaces, applications, or some other type of software. Processing system 1106 may include a microprocessor and other circuitry to retrieve and execute software 1110 from storage 1108. Processing node 1100 may further include other components such as a power management unit, a control interface unit, etc., which are omitted for clarity. Communication interface 1102 permits processing node 1100 to communicate with other network elements. User interface 1104 permits the configuration and control of the operation of processing node 1100.

An example of processing node 1100 includes access nodes 110, 120. Processing node 1100 can also be an adjunct or component of a network element, such as an element of access node 110, 120, gateway 103, controller node 104, a mobility management entity, a gateway, a proxy node, a wireless device or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for scheduling resources in a wireless network, the method comprising:
    monitoring, by a scheduler of an access node, a usage of air-interface resources deployed by the access node, wherein the air-interface resources comprise a plurality of resource blocks within a frequency bandwidth that is scheduled for normal-priority and high-priority transmissions;
    identifying, by the scheduler, a portion of the air-interface resources that is available for a low-priority transmission from a wireless device attached to the access node, wherein the low-priority transmission requires at least 180 KHz, and the portion comprises a bandwidth of at least 180 kHz; and
    scheduling the low-priority transmission in the identified portion of the air-interface resources.

2. The method of claim 1, wherein identifying the portion of air-interface resources available for the low-priority transmission comprises identifying unused resource blocks from the plurality of resource blocks.

3. The method of claim 2, wherein identifying unused resource blocks further comprises identifying at least one unused resource slot, wherein the at least one unused resource slot has a bandwidth of 180 kHz.

4. The method of claim 3, wherein scheduling the portion of air-interface resources comprises scheduling the at least one unused resource slot towards a narrowband internet-of-things (NB-IoT) transmission.

5. The method of claim 2, wherein identifying unused resource blocks further comprises identifying at least one unused resource slot, wherein the at least one unused resource slot has a bandwidth of 1080 kHz.

6. The method of claim 5, wherein scheduling the portion of air-interface resources comprises scheduling the at least one unused resource slot towards a long-term-evolution category-M (LTE-M) transmission.

7. The method of claim 1, wherein scheduling the portion of air-interface resources for the low-priority transmissions comprises scheduling unused resource blocks at an edge of the frequency bandwidth.

8. The method of claim 7, wherein the edge of the frequency bandwidth is determined based on a distance from a center frequency.

9. The method of claim 8, further comprising determining that the portion of air-interface resources that are available is non-contiguous; and shifting the center frequency until a contiguous portion of air-interface resources becomes available.

10. The method of claim 8, further comprising determining that the portion of air-interface resources that are available is non-contiguous; and changing the distance from the center frequency until a contiguous portion of air-interface resources becomes available.

11. The method of claim 1, further comprising enabling multiple retransmissions of the portion of air-interface resources scheduled for the low-priority transmissions.

12. A system for scheduling resources in a wireless network, the system comprising:
    a processing node; and
    a processor coupled to the processing node, the processor for configuring the processing node to perform operations comprising:

identifying, by a scheduler of an access node, available resource blocks from a plurality of resource blocks deployed by the access node, wherein the plurality of resource blocks are within a frequency bandwidth that is scheduled for normal-priority and high-priority transmissions, and wherein the available resource blocks provide a bandwidth of at least 180 kHz sufficient for a low-priority transmission comprising a bandwidth at least 180 KHz; and scheduling the portion of the available resource blocks for the low-priority transmission between the access node and an internet-of-things (IoT) device.

13. The system of claim 12, wherein the low-priority transmission comprises a narrowband IoT transmission from the IoT device.

14. The system of claim 12, wherein the portion of available resource blocks provide a bandwidth of 1080 kHz.

15. The system of claim 14, wherein the low-priority transmission comprises a long-term-evolution category-M (LTE-M) transmission from the IoT device.

16. A processing node for scheduling resources in a wireless network, the processing node being configured to perform operations comprising:

monitoring, by a scheduler of an access node, a usage of air-interface resources deployed by the access node, wherein the air-interface resources comprise a plurality of resource blocks within a frequency bandwidth that is scheduled for normal-priority and high-priority transmissions;

identifying, by the scheduler, a portion of the air-interface resources that is available for a low-priority transmission from a wireless device attached to the access node, wherein the low-priority transmission requires at least 180 KHz, and the portion comprises a bandwidth of at least 180 kHz; and scheduling the low-priority transmission in the identified portion of the air-interface resources.

17. The processing node of claim 16, wherein identifying the portion of air-interface resources available for the low-priority transmission comprises identifying unused resource blocks from the plurality of resource blocks.

18. The processing node of claim 17, wherein the unused resource blocks are at an edge of the frequency bandwidth.

* * * * *